United States Patent
Deng

(10) Patent No.: US 10,724,873 B2
(45) Date of Patent: Jul. 28, 2020

(54) METHOD AND APPARATUS FOR RENDERING NAVIGATION IMAGE AND STORAGE MEDIUM

(71) Applicant: Baidu Online Network Technology (Beijing) Co., Ltd., Beijing (CN)

(72) Inventor: Jian Deng, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 207 days.

(21) Appl. No.: 15/761,008

(22) PCT Filed: Dec. 7, 2015

(86) PCT No.: PCT/CN2015/096521
§ 371 (c)(1),
(2) Date: Mar. 16, 2018

(87) PCT Pub. No.: WO2017/045275
PCT Pub. Date: Mar. 23, 2017

(65) Prior Publication Data
US 2018/0266843 A1 Sep. 20, 2018

(30) Foreign Application Priority Data
Sep. 17, 2015 (CN) .......................... 2015 1 0593464

(51) Int. Cl.
*G01C 21/36* (2006.01)
*G09G 3/20* (2006.01)
(Continued)

(52) U.S. Cl.
CPC ....... *G01C 21/3655* (2013.01); *G01C 21/367* (2013.01); *G06F 1/329* (2013.01);
(Continued)

(58) Field of Classification Search
CPC .. G01C 21/3655; G01C 21/367; G01C 21/00; G01C 21/32; G09G 3/20;
(Continued)

(56) References Cited

U.S. PATENT DOCUMENTS 6,445,397 B1   9/2002  Boyer
9,940,904 B2 * 4/2018  Romano .................. G09G 5/18
(Continued)

FOREIGN PATENT DOCUMENTS

CN        101819754 A      9/2010
CN        103699236 A      4/2014
(Continued)

OTHER PUBLICATIONS

International Search Report dated Jun. 23, 2016 for International Application No. PCT/CN2015/096521, 8 pages.
(Continued)

*Primary Examiner* — Thomas Ingram
(74) *Attorney, Agent, or Firm* — Knobbe, Martens, Olsen & Bear, LLP

(57) ABSTRACT

The present disclosure discloses a method and apparatus for rendering a navigation image and storage medium, the method including: changing a frame limiting parameter according to a current navigation state parameter; and performing frame limiting processing on navigation image rendition according to the frame limiting parameter. According to the embodiments of the present disclosure, a rendered navigation image is determined according to the frame limiting parameter of the current navigation based on the navigation state parameters obtained by a mobile terminal, and the power consumption of the mobile terminal can be reduced without affecting the navigation map and the animated display effect, thereby increasing the per charge usage of the mobile terminal and enhancing the user experience.

12 Claims, 2 Drawing Sheets

(51) Int. Cl.
 *G06F 1/3246* (2019.01)
 *G06F 1/329* (2019.01)

(52) U.S. Cl.
 CPC .............. *G06F 1/3246* (2013.01); *G09G 3/20* (2013.01); *G09G 2320/08* (2013.01); *G09G 2330/023* (2013.01); *G09G 2340/0435* (2013.01)

(58) Field of Classification Search
 CPC ......... G09G 2330/023; G09G 2320/08; G09G 2340/0435; G06F 1/3246; G06F 1/329
 See application file for complete search history.

(56) References Cited

U.S. PATENT DOCUMENTS

| | | | |
|---|---|---|---|
| 2004/0098175 A1 | 5/2004 | Said et al. | |
| 2008/0319654 A1 | 12/2008 | Shintani et al. | |
| 2010/0214328 A1 | 8/2010 | Hara | |
| 2013/0163953 A1* | 6/2013 | Peacock | ................ G06F 9/5016 386/231 |
| 2013/0257752 A1* | 10/2013 | Tripathi | ................... G09G 3/20 345/173 |
| 2013/0342719 A1* | 12/2013 | Tashiro | ................ H04N 7/0127 348/222.1 |
| 2015/0097860 A1 | 4/2015 | Alaniz et al. | |
| 2015/0097863 A1 | 4/2015 | Alaniz et al. | |

FOREIGN PATENT DOCUMENTS

| | | |
|---|---|---|
| JP | 2007218655 A | 8/2007 |
| JP | 2008276307 A | 11/2008 |
| JP | 2014-007672 A | 1/2014 |
| JP | 2015-072687 A | 4/2015 |
| KR | 20130050563 A | 5/2013 |
| KR | 10-2015-0047091 A | 5/2015 |
| WO | 2015023040 A1 | 2/2015 |

OTHER PUBLICATIONS

Written Opinion of the International Searching Authority dated Jun. 23, 2016 for International Application No. PCT/CN2015/096521, 3 pages.

* cited by examiner

METHOD AND APPARATUS FOR RENDERING NAVIGATION IMAGE AND STORAGE MEDIUM

CROSS-REFERENCE TO RELATED APPLICATION

This application is the U.S. National Phase Application under 35 U.S.C. § 371 of International Application No. PCT/CN2015/096521, filed Dec. 7, 2015, designating the U.S. and published as WO 2017/045275 A1 on Mar. 23, 2017 which claims the priority to Chinese Application No. 201510593464.2, filed on Sep. 17, 2015 and entitled "Method and Apparatus for Rendering Navigation Image" with Baidu Online Network Technology (Beijing) Co., Ltd. as the applicant, the entire disclosure of each of which is hereby incorporated by reference.

TECHNICAL FIELD

The present disclosure relates to the technical field of navigation, in particular to a method and apparatus for rendering a navigation image, and a storage medium.

BACKGROUND

As more and more people drive their own cars to visit relatives, go on adventure or a journey, mobile terminals with navigation function are increasingly widely used. The navigation function of a mobile terminal provides by and large convenience to travelers.

An important performance indicator for a mobile terminal with navigation function is it's per charge usage time. The main factor affecting the per charge usage time is the power consumed by navigation. The power consumed during navigation is mainly consumed by the central processing unit (CPU). The power consumption of the CPU by the whole navigation layer module in a mobile terminal accounts for about 30-40% of the total power consumption of the CPU in the mobile terminal. The rendition by the navigation layer module in turn is the major contributor to the excessive power consumption of the navigation layer module.

Currently, the main approach to solve the power consumption of the navigation layer module in mobile terminals is to reduce the frame frequency (that is, the number of navigation image frames rendered on a mobile terminal within a time unit) during navigation. However, the measure taken in the prior art only reduces the frame frequency. When the frame frequency is too low, the navigation animation may become stop and go, thus seriously affecting user's navigation experience.

SUMMARY

In view of the above, the embodiments of the present disclosure provide a method and apparatus for rendering a navigation image, and a storage medium, to improve the user experience without affecting the fluency of navigation images while reducing the frame frequency and improving the per charge capability of a mobile terminal.

In a first aspect, the embodiment of the present disclosure provides a method for rendering a navigation image. The method comprises: changing a frame limiting parameter according to a current navigation state parameter; and performing frame limiting processing on navigation image rendition according to the frame limiting parameter.

In a second aspect, the embodiment of the present disclosure provides an apparatus for rendering a navigation image. The apparatus comprises: a frame limiting parameter changing module, used for changing a frame limiting parameter according to the current navigation state parameters; and a frame limiting processing module, used for performing frame limiting processing on navigation image rendering according to the frame limiting parameter.

In a third aspect, the embodiment of the present disclosure provides a non-volatile computer storage medium storing one or more modules. When the one or more modules are executed by an apparatus rendering a navigation image, the apparatus executes the following operations: changing a frame limiting parameter according to a current navigation state parameter; and performing frame limiting processing on navigation image rendition according to the frame limiting parameter.

According to the method and apparatus for rendering a navigation image, and storage medium as provided by the embodiments, navigation images can be rendered, depending on the specific navigation situations, by dynamically adjusting the frame limiting threshold, thereby reducing the influence on the display effect of the navigation image, and the power consumption.

BRIEF DESCRIPTION OF THE DRAWINGS

In order to clearly describe the technical solution in the embodiments of the present disclosure, the drawings used in describing the embodiments will be briefly introduced below. Clearly, the drawings described below are only some embodiments of the present disclosure. Those skilled in the art can modify and replace these drawings without creative work.

DETAILED DESCRIPTION OF EMBODIMENTS

The technical solution in the embodiments of the present disclosure will be described clearly and completely below. Evidently, the embodiments described are only some embodiments of the present disclosure, but not all embodiments. These embodiments are only used to describe the present disclosure, but not to limit the present disclosure. Based on the embodiments of the present disclosure, all other embodiments obtained by those skilled in the art without creative work fall within the protection scope of the disclosure.

First Embodiment

Figure 1:
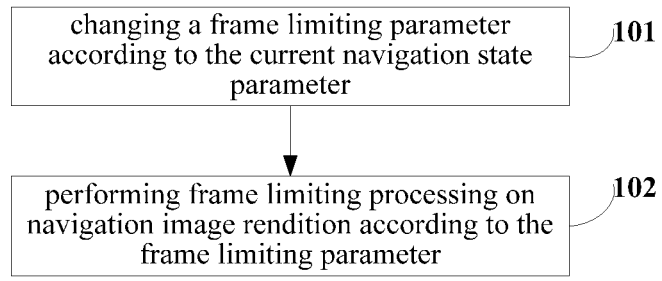
FIG. 1 is a flow chart illustrating a method for rendering a navigation image as provided in a first embodiment of the present disclosure.

FIG. 1 is a flow chart illustrating a method for rendering a navigation image as provided in a first embodiment of the present disclosure. The method can be executed by an apparatus for rendering a navigation image. The apparatus may be implemented by software and/or hardware and may generally be integrated within a mobile terminal having a navigation function. The mobile terminal may be a mobile phone, a tablet, or a GPS navigator.

As shown in FIG. 1, the method specifically includes the following steps:

Step 101: changing a frame limiting parameter according to a current navigation state parameter; and Step 102: performing frame limiting processing on navigation image rendition according to the frame limiting parameter.

Currently, navigation image rendition is usually accomplished by starting a navigation image rendering thread. One of the important parameters is the start interval of the navigation image rendering thread, which is used to describe how often a navigation image rendering thread is started to render a navigation image frame. In general, the navigation function in a mobile terminal does not limit the navigation image rendering thread. The navigation rendering frame frequency (the reciprocal of the start interval of the navigation image rendering thread) of a high-end mobile terminal is usually very high, and may be up to about 90 fps. However, the fluency of the navigation map and the picture presented at an overly high navigation rendering frame frequency does not noticeably change the user's visual experience. However, the excessive navigation rendition to a large extent increases the power consumption of the mobile terminal. For this reason, the per charge usage time of the mobile terminal can be increased by frame limiting processing (that is reduction of frame frequency) according to the frame limiting parameters. In fact, unlike games, navigation has no strict requirements for frame frequency. After several tests, it is found that even if the frame frequency is reduced to about 25 fps, the difference between the smooth animation of the navigation image and the animation without frame limiting cannot be felt by human eyes.

Under normal circumstances, the start interval of the navigation image rendering thread in mobile terminal is often short, and the frame frequency is high. For example, a frame limiting time threshold greater than the start interval of the navigation image rendering thread may be set, based on the control over the hibernation of the navigation image rendering thread by the threshold, to increase the time interval between two adjacent navigation image renditions, and reduce the frame frequency, thereby reducing the power consumption. In the embodiment, the frame limiting time thread is the frame limiting parameter.

Specifically, the time difference $\Delta T_1$ between the current time and the last navigation image rendering time is calculated based on a set period after the navigation image rendering thread in a mobile terminal is started for the first time. The difference $\Delta T_2$ between the frame limiting time threshold and the current time difference is calculated. The navigation image rendering thread is controlled to hibernate based on the difference $\Delta T_2$; and a navigation image is rendered when the hibernation mode of the navigation image rendering thread ends. As the start interval of the rendering thread is short, the frame limiting time threshold is large and the difference $\Delta T_2$ is greater than 0, the duration of the hibernation difference $\Delta T_2$ of the navigation image rendering thread can be controlled.

In another embodiment of the present embodiment, the start interval of navigation image rendering thread can also be directly used as the frame limiting parameter, and the frame limiting processing is performed by extending the interval so as to increase the time interval between two adjacent navigation image rendering operations, thereby reducing the frame frequency. Later, the rendering time is determined according to the extended start interval of the current navigation image rendering thread, and a navigation image is rendered based on the rendering time. For example, the initial start interval of the navigation image rendering thread is 0.2 seconds, and the new start interval of the navigation image rendering thread is 0.4 seconds after frame limiting. Upon a navigation image rendering (supposing that the current rendering time is 1.9 seconds), the next navigation image rendering time will be determined as 1.9 seconds+0.4 seconds=2.3 seconds, instead of 1.9 seconds+0.2 seconds=2.1 seconds.

However, in the case where the frame limiting parameter is set to a fixed non-value, if the set frame limiting time threshold or the start interval of the navigation image rendering thread is too long, the fluency of the navigation map will be affected or even the image will become stop and go. For example, when a base map is dragged in the navigation process, too low frame frequency will result in a lingering effect. If the set frame limiting time threshold or the start interval of the navigation image rendering thread is short, the goal of power saving cannot be achieved. Therefore, on the basis of the frame limiting processing, in order to minimize the power consumption and reduce the influence on the display effect of the navigation image, the frame limiting parameters can be dynamically adjusted in real time based on different navigation scenes in the present embodiment. The adjustment rule is as follows: in the navigation scene where the requirements for frame frequency is not high, the frame limiting time threshold or the start interval of the navigation image rendering thread is increased so long as it does not affect user's visual experience, thus saving more CPU consumption and power to a larger extent. In navigation scenes where the requirements for frame frequency is high, the frame limiting time threshold or the start interval of the navigation image rendering thread is reduced so as to ensure the display effect of navigation map.

Specifically, a frame limiting parameter may be changed according to the current navigation state parameters. In the exemplary case, the changing process includes real-time monitoring of the state parameters of the mobile terminal after the navigation function is started, and identification of the current scene according to these parameters so as to change the current frame limiting parameters into frame limiting parameters suitable to such scene.

According to the technical solution as provided in the embodiment, navigation images can be rendered by dynamically adjusting the frame limiting threshold depending on particular situation, which can reduce the influence on the display effect of the navigation image and reduce the power consumption.

Second Embodiment

Figure 2:
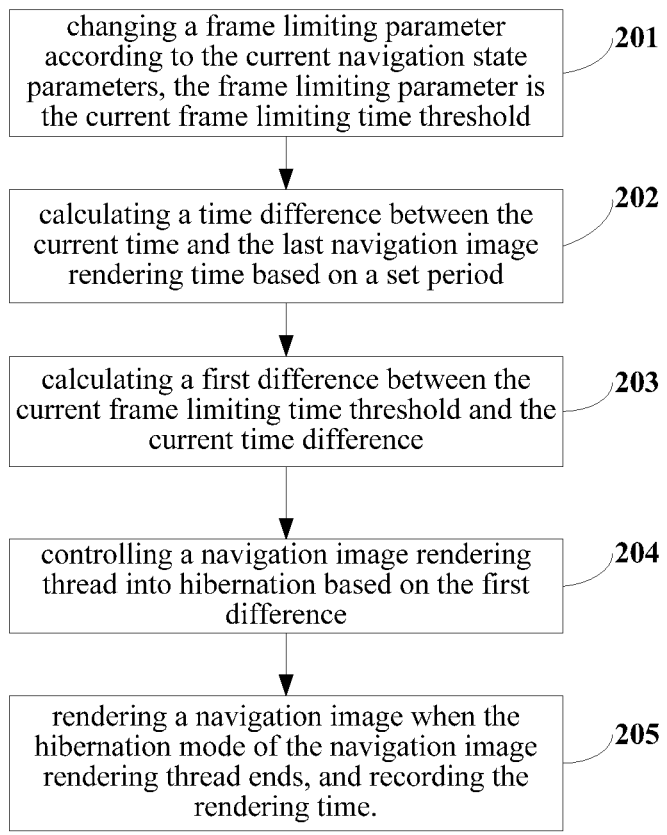
FIG. 2 is a flow chart illustrating a method for rendering a navigation image as provided in a second embodiment of the present disclosure.

FIG. 2 is a flow chart illustrating a method for rendering a navigation image as provided in a second embodiment of the present disclosure, and the method for rendering a navigation image is based on the embodiment above. Further, when the frame limiting parameter is the current frame limiting time threshold, the operation of performing frame limiting processing on navigation image rendition according to the frame limiting parameter is optimized as follows: calculating a time difference between the current time and the last navigation image rendering time based on a set period; calculating a first difference between the current frame limiting time threshold and the current time difference; controlling a navigation image rendering thread to hibernate based on the first difference; and rendering a navigation image when the hibernation mode of the navigation image rendering thread ends, and recording the rendering time.

As shown in FIG. 2, the method specifically includes the following steps:

step 201: changing a frame limiting parameter according to the current navigation state parameter, wherein the frame limiting parameter is the current frame limiting time threshold;

step 202: calculating a time difference between the current time and the last navigation image rendering time based on a set period.

In the present embodiment, the set period is not particularly limited. Preferably, the set period should be less than twice the start interval of the navigation image rendering thread, thus ensuring that the time interval between the navigation frame images is a fixed frame limiting time threshold. For simplicity, the start interval of the navigation image rendering thread may be directly acquired as a set period.

After the mobile terminal starts the navigation image rendering thread for the first time and the mobile terminal acquires the set period of the current navigation, the time difference $\Delta T_1$ between the current time and the last navigation image rendering time is calculated once in a while based on the set period.

Step 203: calculating a first difference between the current frame limiting time threshold and the current time difference; calculating, by a navigation image rendering means integrated in the mobile terminal, the difference $\Delta T_2$ between the current frame limiting time threshold T and the time difference $\Delta T_1$ as calculated in step 202, that is $\Delta T_2 = T - \Delta T_1$.

Step 204: controlling a navigation image rendering thread into hibernation based on the first difference.

The navigation image rendering thread is controlled by using the difference $\Delta T_2$ calculated in step 203. The operation of controlling the navigation image rendering thread to hibernate may be as follows: when the difference $\Delta T_2$ is greater than zero, that is, when the current frame limiting time threshold is greater than the time difference, the navigation rendering thread is controlled to hibernate with a navigation image rendering means integrated in the mobile terminal.

Step 205: rendering a navigation image when the hibernation mode of the navigation image rendering thread ends, and recording the rendering time.

The present embodiment further provides a method for controlling the navigation image rendering frame frequency by using a difference between the time difference (between the current time and the last navigation image rendering time) and the current frame limiting time threshold based on the current navigation state parameters, which can well achieve the display effect of navigation map and animation and effectively improve the per charge usage of the mobile terminal, thereby enhancing the user experience.

Third Embodiment

Figure 3:
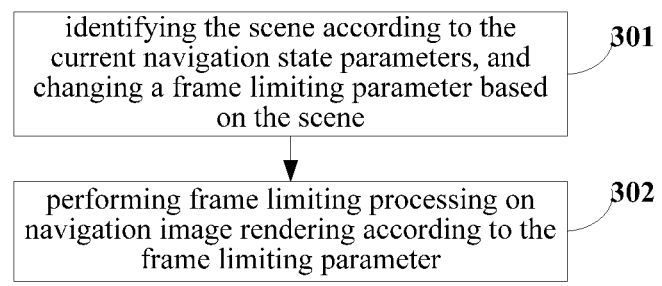
FIG. 3 is a flow chart illustrating a method for rendering a navigation image as provided in a third embodiment of the present disclosure.

FIG. 3 is a flow chart illustrating a method for rendering a navigation image as provided in a third embodiment of the present disclosure, and the method for rendering a navigation image is based on the embodiments above. Further, the operation of changing the current navigation state parameter into the frame limiting parameter is optimized as follows: identifying an actual scene according to the current navigation state parameters, and changing the frame limiting parameter based on the actual scene.

Referring to FIG. 3, the method specifically includes the following step: step 301: identifying the actual scene according to the current navigation state parameters, and changing the frame limiting parameter based on the actual scene.

In the exemplary case, the actual scene includes any one of the following: following state, browsing state where user interaction occurs and high-speed driving state of the vehicle.

In the following state, the navigation function of the mobile terminal is completely given to the navigation image rendering apparatus integrated in the mobile terminal to control such parameters as the viewing angle and center point of the navigation map or animation in general, and a user passively observes the navigation map or animation. In this case, the navigation requirements for frame frequency is very low as the center of the navigation map or animation is generally located on the vehicle's indicator. Therefore, a large frame limiting parameter may be set. In the browsing state where user interaction occurs, the user can actively adjust the navigation map or animation according to the demand. For example, the user can enlarge an area in the map or animation, or drag the map or animation to change the display area. In the browsing state where user interaction occurs or high-speed driving state of vehicle, the navigation requirements for frame frequency are relatively high. Therefore, a small frame limiting parameter may be set.

The state parameter may be a detected movement speed of the mobile terminal, a control command for a navigation map displayed in the mobile terminal as entered by the user, and a selection parameter between the navigation browsing state and the following state. The operation of identifying the actual scene according to the current navigation state parameter may specifically include:

identifying whether the mobile terminal is located in a high-speed traveling vehicle based on the detected movement speed of the mobile terminal. If yes, identifying the actual scene as the high-speed driving state of the vehicle.

If the selection parameter is the browsing state parameter, monitoring whether the control instructions for the navigation map displayed in the mobile terminal as input by the user is acquired within a sliding window at set time for multiple times; if yes, identifying the actual scene as the browsing state where user interaction occurs.

If the selection parameter is the following state parameter, identifying the actual scene as the following state.

Step 302: performing frame limiting processing on navigation image rendition according to the frame limiting parameter.

The present embodiment further provides a method for controlling the navigation image rendering frame frequency by identifying the navigation scene with the current state parameter and changing the frame limiting parameter based on the actual scene, which can well achieve the display effect of navigation map and animation, and effectively improve the per charge usage of the mobile terminal, thereby enhancing the user experience.

Fourth Embodiment

Figure 4:
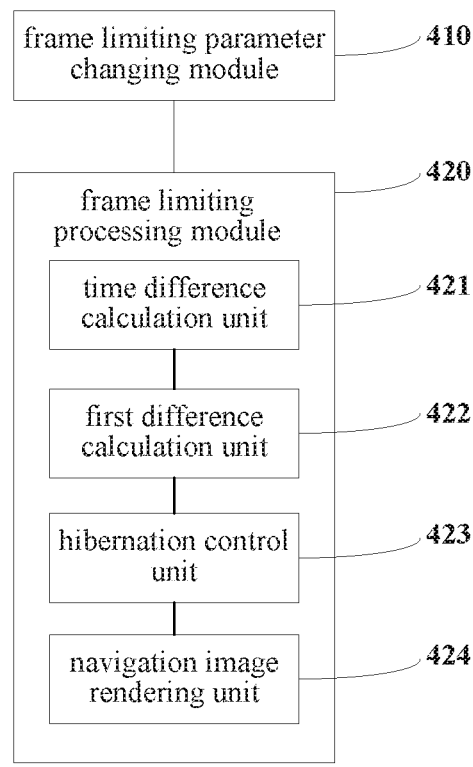
FIG. 4 is a structural diagram illustrating an apparatus for rendering a navigation image as provided in a fourth embodiment of the present disclosure.

FIG. 4 is a structural diagram illustrating an apparatus for rendering a navigation image as provided in a fourth embodiment of the present disclosure. The apparatus for rendering a navigation image comprises:

a frame limiting parameter changing module 410, used for changing a frame limiting parameter according to a current navigation state parameter; and a frame limiting processing module 420, used for performing frame limiting processing on navigation image rendition according to the frame limiting parameter.

On the basis of the above solution, the frame limiting processing module 420 preferably includes: a time difference calculation unit 421, used for calculating a current time difference between current time and last navigation image rendering time based on a set period; a first difference calculation unit 422, used for calculating a first difference between the current frame limiting time threshold and the current time difference; a hibernation control unit 423, used for controlling a navigation image rendering thread into hibernation based on the first difference; and a navigation image rendering unit 424, used for rendering a navigation image when the hibernation of the navigation image rendering thread ends, and recording rendering time.

Further, the frame limiting processing module 420 is specifically used for determining rendering time according to the start interval of the current navigation image rendering thread, and rendering the navigation image based on the rendering time, when the frame limiting parameter is a start interval of a navigation image rendering thread.

The frame limiting parameter changing module 410 is specifically used for identifying a scene according to the current navigation state parameter, and changing the frame limiting parameter based on the scene, wherein the scene includes any one of the following: a following state, a browsing state where user interaction occurs and a high-speed driving state of vehicle.

The product above may execute the method as provided in any one of the embodiments of the present disclosure, and has the corresponding functional modules and the beneficial effects of the executed method.

Fifth Embodiment

The present embodiment provides a non-volatile computer storage medium storing one or more modules. When the one or more modules are executed by an apparatus for rendering a navigation image, the apparatus executes the following operations:

changing a frame limiting parameter according to the current navigation state parameters; and performing frame limiting processing on navigation image rendition according to the frame limiting parameter.

Where a module stored in the storage medium is executed by the apparatus, the operation of performing frame limiting processing on navigation image rendition according to the frame limiting parameter when the frame limiting parameter is the current frame limiting time threshold may specifically include:

calculating a time difference between the current time and the last navigation image rendering time based on a set period;

calculating a first difference between the current frame limiting time threshold and the current time difference;

controlling a navigation image rendering thread to hibernate according to the first difference; and rendering a navigation image when the hibernation mode of the navigation image rendering thread ends, and recording the rendering time.

Where a module stored in the storage medium is executed by the apparatus, the operation of performing frame limiting processing on navigation image rendering according to the frame limiting parameter when the frame limiting parameter is the start interval of the navigation image rendering thread may specifically include:

determining the rendering time according to the start interval of the current navigation image rendering thread, and rendering a navigation image based on the rendering time.

Where a module stored in the storage medium is executed by the apparatus, the operation of changing the frame limiting parameter according to the current navigation state parameters may specifically include:

identifying the scene according to the current navigation state parameters, and changing a frame limiting parameter based on the scene.

When the module stored in the storage medium is executed by the apparatus, the scene includes any of the following: following state, browsing state where user interaction occurs and high-speed driving state of vehicle.

Sixth Embodiment

Figure 5:
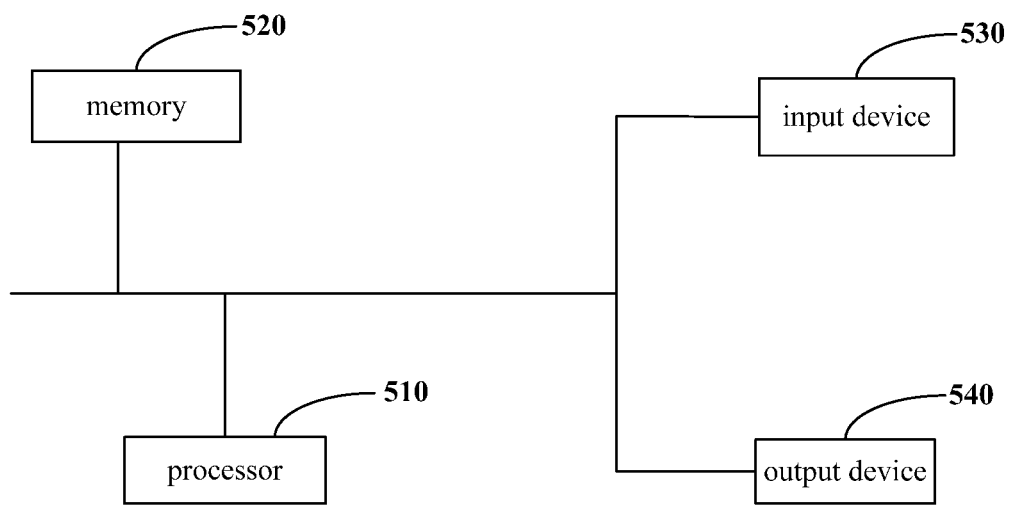
FIG. 5 is a hardware structure diagram of an apparatus executing method for rendering a navigation image as provided in a sixth embodiment of the present disclosure.

FIG. 5 is a schematic diagram of a device hardware structure for executing a method for rendering a navigation image as according to a sixth embodiment of the present disclosure.

The device comprises:

one or more processors 510, wherein one processor 510 is taken as an example in FIG. 5;

a memory 520; and one or more modules.

The device may further comprise: an input apparatus 530 and an output apparatus 540. The processor 510, the memory 520, the input apparatus 530, and the output apparatus 540 in the device may be connected via a bus or in other modes. Connection by a bus is used as an example in FIG. 5.

As a computer readable storage medium, the memory 520 may be used to store software programs, computer executable programs, and modules, for example, the program instructions/modules corresponding to the method for rendering a navigating image in the embodiments of the present disclosure (for example, the frame limiting parameter changing module 410 and the frame limiting processing module 420 as shown in FIG. 4). The processor 510 runs the software programs, instructions and modules stored in the memory 520, that is, to implement the method for rendering a navigating image of the above method embodiments.

The memory 520 may include a program storage area and a data storage area. The program storage area may store an operating system and an application required for at least one function. The data storage area may store data and the like created according to the usage of a terminal device. In addition, the memory 520 may include a high-speed random access memory, and may also include a non-volatile memory, e.g., at least one disk storage device, a flash memory device or other non-volatile solid-state storage devices. In some embodiments, the memory 520 may further include memories remotely arranged relative to the processor 510, where the remote memories may be connected to the terminal device by a network. An example of the above network includes but not limited to, the Internet, an enterprise intranet, a local area network, a mobile communications network, and a combination thereof.

The input apparatus 530 may be used for receiving entered digit or character information, and generating a key signal input related to the user setting and function control of the terminal device. The output apparatus 540 may include a display screen and other display devices.

The one or more modules stored in the memory 520, when executed by the one or more processors 510, perform the following operations:

changing a frame limiting parameter according to a current navigation state parameter; and performing frame limiting processing on navigation image rendition according to the frame limiting parameter.

Further, the performing frame limiting processing on navigation image rendering according to the frame limiting parameter, when the frame limiting parameter is the current frame limiting time threshold may specifically includes:

calculating a current time difference between current time and last navigation image rendering time based on a set period;

calculating a first difference between the current frame limiting time threshold and the current time difference;

controlling a navigation image rendering thread into hibernation based on the first difference; and rendering a navigation image when the hibernation of the navigation image rendering thread ends, and recording rendering time.

Further, the performing frame limiting processing on navigation image rendering according to the frame limiting parameter when the frame limiting parameter is the start interval of the navigation image rendering thread may specifically include:

determining rendering time according to the start interval of the current navigation image rendering thread, and rendering the navigation image based on the rendering time.

Further, the changing the frame limiting parameter according to the current navigation state parameter may specifically include:

identifying a scene according to the current navigation state parameter, and changing the frame limiting parameter based on the scene.

Further, the scene includes any one of the following: a following state, a browsing state where user interaction occurs and a high-speed driving state of vehicle.

Through the above description of the embodiments, it should be apparent to those skilled in the art that the present disclosure may be implemented by means of software and requisite general hardware, or naturally may be implemented by hardware, but in many cases the former is a better embodiment. Based on such understanding, the technical solution of the present disclosure essentially, or the part that contributes over the existing technology may be embodied in the form of a software product. The computer software product may be stored in a computer readable storage medium such as a hard disk, an optical disk, a read-only memory (ROM) or a random access memory (RAM), comprising a plurality of instructions for causing a computer device (which may be a personal computer, a server, or a network device, etc.) to execute the methods described in the embodiments of the present disclosure.

It should be noted that in the embodiments of the device for rendering a navigation image described above, the respective units and modules are divided according to the functional logics, but not limited to the above-described division, as long as the corresponding function may be achieved. In addition, the specific name of each of functional units is merely for ease of mutual distinction and is not intended to limit the scope of the present disclosure.

The above descriptions are merely specific implementations of the present disclosure, but the protection scope of the present disclosure is not limited thereto. Any variations or replacements that can be easily conceived of by those skilled in the art within the technical scope disclosed by the present disclosure shall be encompassed by the protection scope of the present disclosure. Therefore, the protection scope of the present disclosure shall be subject to the protection scope of the claims.

What is claimed is:

1. A method for rendering a navigation image, comprising:

changing a frame limiting parameter according to a current navigation state parameter; and performing frame limiting processing on navigation image rendition according to the frame limiting parameter, wherein the frame limiting parameter is a current frame limiting frame threshold, and the performing frame limiting processing on navigation image rendering according to the frame limiting parameter comprises:

calculating a current time difference between current time and last navigation image rendering time based on a set period;

calculating a first difference between the current frame limiting time threshold and the current time difference;

controlling a navigation image rendering thread into hibernation based on the first difference; and rendering a navigation image when the hibernation of the navigation image rendering thread ends, and recording rendering time, and wherein the method is performed by one or more processors.

2. The method according to claim 1, wherein the frame limiting parameter is a start interval of a navigation image rendering thread, and the performing frame limiting processing on navigation image rendition according to the frame limiting parameter comprises:

determining rendering time according to the start interval of the current navigation image rendering thread, and rendering the navigation image based on the rendering time.

3. The method according to claim 1, wherein the changing a frame limiting parameter according to a current navigation state parameter comprises:

identifying a scene according to the current navigation state parameter, and changing the frame limiting parameter based on the scene.

4. The method according to claim 3, wherein the scene includes any one of the following:

a following state, a browsing state where user interaction occurs or a high-speed driving state of a vehicle.

5. An apparatus for rendering a navigation image, comprising:

at least one processor; and a non-transitory memory storing computer executable instructions, the instructions when executed by the at least one processor, cause the at least one processor to perform operations, the operations comprising:

changing a frame limiting parameter according to a current navigation state parameter; and performing frame limiting processing on navigation image rendition according to the frame limiting parameter, wherein the frame limiting parameter is a current frame limiting frame threshold, and the performing frame limiting processing on navigation image rendering according to the frame limiting parameter comprises:

calculating a current time difference between current time and last navigation image rendering time based on a set period;

calculating a first difference between the current frame limiting time threshold and the current time difference;

controlling a navigation image rendering thread into hibernation based on the first difference; and rendering a navigation image when the hibernation of the navigation image rendering thread ends, and recording rendering time.

6. The apparatus according to claim 5, wherein the frame limiting parameter is a start interval of a navigation image rendering thread, and the performing frame limiting processing on navigation image rendition according to the frame limiting parameter comprises:

determining rendering time according to the start interval of the current navigation image rendering thread, and rendering the navigation image based on the rendering time.

7. The apparatus according to claim 5, wherein the changing a frame limiting parameter according to a current navigation state parameter comprises:

identifying a scene according to the current navigation state parameter, and changing the frame limiting parameter based on the scene.

8. The apparatus according to claim 7, wherein the scene comprises any one of the following:

a following state, a browsing state where user interaction occurs or a high-speed driving state of vehicle.

9. A non-volatile non-transitory computer storage medium, the computer storage medium storing one or more computer executable instructions, wherein when the one or more computer executable instructions are executed by an apparatus rendering a navigation image, the apparatus executes the following operations:

changing a frame limiting parameter according to a current navigation state parameter; and performing frame limiting processing on navigation image rendition according to the frame limiting parameter, wherein the frame limiting parameter is a current frame limiting frame threshold, and the performing frame limiting processing on navigation image rendering according to the frame limiting parameter comprises:

calculating a current time difference between current time and last navigation image rendering time based on a set period;

calculating a first difference between the current frame limiting time threshold and the current time difference;

controlling a navigation image rendering thread into hibernation based on the first difference; and rendering a navigation image when the hibernation of the navigation image rendering thread ends, and recording rendering time.

10. The computer storage medium according to claim 9, wherein the frame limiting parameter is a start interval of a navigation image rendering thread, and the performing frame limiting processing on navigation image rendition according to the frame limiting parameter comprises:

determining rendering time according to the start interval of the current navigation image rendering thread, and rendering the navigation image based on the rendering time.

11. The computer storage medium according to claim 9, wherein the changing a frame limiting parameter according to a current navigation state parameter comprises:

identifying a scene according to the current navigation state parameter, and changing the frame limiting parameter based on the scene.

12. The computer storage medium according to claim 11, wherein the scene includes any one of the following:

a following state, a browsing state where user interaction occurs or a high-speed driving state of a vehicle.

* * * * *